(12) United States Patent
Sienkiewicz et al.

(10) Patent No.: US 12,219,520 B2
(45) Date of Patent: Feb. 4, 2025

(54) ELECTRONIC DEVICE FOR DETERMINING LOCATIONS OF EXTERNAL DEVICES AND OPERATION METHOD FOR SAME

(71) Applicant: Samsung Electronics Co., Ltd., Suwon-si (KR)

(72) Inventors: Adam Sienkiewicz, Warsaw (PL); Aleksander Losiewicz, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 17/908,131

(22) PCT Filed: Mar. 6, 2020

(86) PCT No.: PCT/KR2020/003197
§ 371 (c)(1),
(2) Date: Aug. 30, 2022

(87) PCT Pub. No.: WO2021/177496
PCT Pub. Date: Sep. 10, 2021

(65) Prior Publication Data
US 2023/0124946 A1    Apr. 20, 2023

(51) Int. Cl.
*H04W 64/00* (2009.01)
*G01S 11/08* (2006.01)
(Continued)

(52) U.S. Cl.
CPC ........... *H04W 64/003* (2013.01); *G01S 11/08* (2013.01); *H04B 1/7163* (2013.01); *H04B 2001/6912* (2013.01)

(58) Field of Classification Search
CPC ..... H04W 64/003; G01S 11/08; H04B 1/7163
See application file for complete search history.

(56) References Cited

U.S. PATENT DOCUMENTS 8,676,427 B1    3/2014  Ferguson et al.
9,201,140 B2   12/2015  Lee
(Continued)

FOREIGN PATENT DOCUMENTS

EP      1 217 608 A2    6/2002
JP      3838029 B2     10/2006
(Continued)

OTHER PUBLICATIONS

Adrian Willings, Doubling up on Alexa: How to use multiple Amazon Echo devices together_2019.
(Continued)

*Primary Examiner* — Curtis B Odom
(74) *Attorney, Agent, or Firm* — Jefferson IP Law, LLP

(57) ABSTRACT

A method, performed by an electronic device, of determining a location of an external device includes: receiving a trigger signal, which is output at a first location; receiving, after the trigger signal is received, a first chirp signal transmitted from a first external device among at least one external device present at a different location from a location of the electronic device, the first chirp signal being transmitted according to the trigger signal being received by the first external device; obtaining, based on a time point at which the first chirp signal is received, a difference value between a time point at which the trigger signal is received by the electronic device and a time point at which the trigger signal is received by the first external device; and determining a location of the first external device based on the difference value.

15 Claims, 9 Drawing Sheets

(51) Int. Cl.
  *H04B 1/7163* (2011.01)
  *H04B 1/69* (2011.01)

(56) References Cited

U.S. PATENT DOCUMENTS

| | | | |
|---|---|---|---|
| 9,318,107 | B1 | 4/2016 | Sharifi |
| 9,424,841 | B2 | 8/2016 | Foerster et al. |
| 9,875,081 | B2 | 1/2018 | Meyers et al. |
| 2015/0029880 | A1 | 1/2015 | Burns et al. |
| 2019/0179004 | A1 | 6/2019 | Okada |
| 2019/0268710 | A1* | 8/2019 | Shi .................. H04R 3/005 |

FOREIGN PATENT DOCUMENTS

| | | |
|---|---|---|
| JP | 2018-031601 A | 3/2018 |
| KR | 10-2012-0122806 A | 11/2012 |
| KR | 10-2017-0049689 A | 5/2017 |
| KR | 10-2019-0135267 A | 12/2019 |

OTHER PUBLICATIONS

Paul Quinn, What happens when you have more than one Google Home? Chaos._ 2017.
Wikipedia, Symmetrical double-sided two-way ranging, https://en.wikipedia.org/wiki/Symmetrical_double-sided_two-way_ranging.
Pascal Getreuer et al., Ultrasonic Communication Using Consumer Hardware, IEEE Transactions on Multimedia, vol. 20, No. 6, Jun. 2018.
Wikipedia, Chirp, https://en.wikipedia.org/wiki/Chirp.
Wikipedia, Window function, https://en.wikipedia.org/wiki/Window_function.
Wikipedia, Pearson correlation coefficient, https://en.wikipedia.org/wiki/Pearson_correlation_coefficient.
International Search Report dated Dec. 2, 2020, issued in International Application No. PCT/KR2020/003197.

* cited by examiner

ELECTRONIC DEVICE FOR DETERMINING LOCATIONS OF EXTERNAL DEVICES AND OPERATION METHOD FOR SAME

TECHNICAL FIELD

The present disclosure relates to an electronic device for determining the location of an external device, and an operating method of the electronic device.

BACKGROUND ART

An electronic device having received an input from a user may request an operation corresponding to the user input, from at least one external device among various external devices around the user. For example, the electronic device may transmit a request to an external device that is located closest to the user among the external devices around the user.

Therefore, the electronic device may determine a device to which the request corresponding to the user input is to be transmitted, based on the distance between the user and the at least one external device.

However, in the case in which the location of the user or the external device may be changed in real time, the electronic device needs perform a method of quickly and accurately obtaining the distance between the user and the external device.

DESCRIPTION OF EMBODIMENTS

Solution to Problem

In order to solve the above-described technical objectives, the present disclosure provides an electronic device for estimating the location of an external device, and an operating method of the electronic device.

The present disclosure also provides a computer-readable recording medium having recorded thereon a program for executing the method on a computer. The technical objects to be solved are not limited to those described above, and other technical objects may be inferred from the following embodiments.

MODE OF DISCLOSURE

Figure 1:
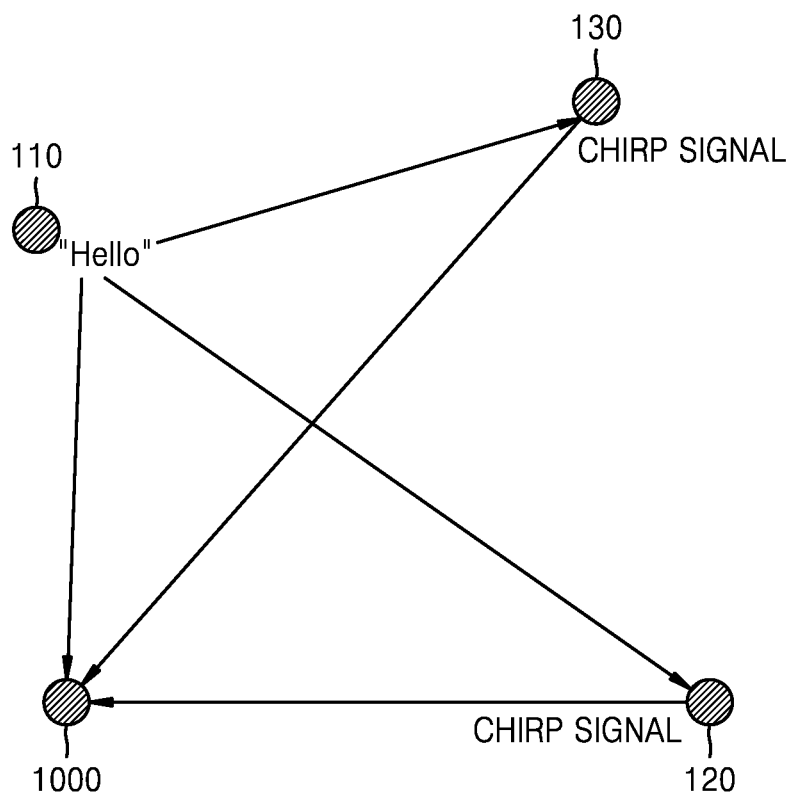
FIG. 1 is a diagram illustrating an example of a method of determining the location of at least one external device, according to an embodiment.

According to a first aspect of the present disclosure, there is provided a method, performed by an electronic device, of determining a location of an external device including: receiving a trigger signal, which is output at a first location; receiving, after the trigger signal is received, a first chirp signal transmitted from a first external device among at least one external device present at a different location from a location of the electronic device, the first chirp signal being transmitted according to the trigger signal being received by the first external device; obtaining, based on a time point at which the first chirp signal is received, a difference value between a time point at which the trigger signal is received by the electronic device and a time point at which the trigger signal is received by the first external device; and determining a location of the first external device based on the difference value.

In addition, according to a second aspect of the present disclosure, there is provided an electronic device for determining a location of an external device including: a communication unit configured to receive a trigger signal, which is output at a first location, and receive, after the trigger signal is received, a first chirp signal transmitted from a first external device among at least one external device present at a different location from a location of the electronic device, the first chirp signal being transmitted according to the trigger signal being received by the first external device; at least one processor configured to obtain, based on a time point at which the first chirp signal is received, a difference value between a time point at which the trigger signal is received by the electronic device and a time point at which the trigger signal is received by the first external device, and determine a location of the first external device based on the difference value; and a memory for storing the trigger signal and the first chirp signal, which are received by the electronic device.

In addition, according to a third aspect of the present disclosure, there is provided a recording medium having recorded thereon a program for performing the method of the first aspect.

Hereinafter, embodiments of the present disclosure will be described in detail with reference to the accompanying drawings for one of skill in the art to be able to implement the embodiments of the present disclosure without any difficulty. The present disclosure may, however, be embodied in many different forms and should not be construed as being limited to the embodiments of the present disclosure set forth herein. In order to clearly describe the present disclosure, portions that are not relevant to the description of the present disclosure are omitted, and similar reference numerals are assigned to similar elements throughout the specification.

Throughout the present specification, when a part is referred to as being "connected to" another part, it may be "directly connected to" the other part or be "electrically connected to" the other part through an intervening element. In addition, when an element is referred to as "including" a component, the element may additionally include other components rather than excluding other components as long as there is no particular opposing recitation.

Hereinafter, the present disclosure will be described in detail with reference to the accompanying drawings.

FIG. 1 is a diagram illustrating an example of a method of determining the location of at least one external device, according to an embodiment.

Referring to FIG. 1, when a trigger signal (e.g., 'Hello') is output at a first location 110, an electronic device 1000 and one or more external devices 120 and 130 may receive the trigger signal.

According to an embodiment, a trigger signal including "Hello" may be output as a user utters a voice including "Hello" at the first location 110. The electronic device 1000 and the one or more external devices 120 and 130 may receive, as a trigger signal, an audio signal including the voice "Hello" uttered by the user.

The electronic device 1000 according to an embodiment may determine the locations of the one or more external devices 120 and 130 according to reception of the trigger signal. Accordingly, the electronic device 1000 may determine a device, among the one or more external devices 120 and 130, to perform an operation according to a voice command uttered by the user after the trigger signal is output.

According to an embodiment, after the trigger signal including "Hello" is output, an audio signal including a voice command may be output by the user at the first location 110. The electronic device 1000 according to an embodiment may determine a device, among the one or more external devices 120 and 130, to perform the user's voice command, by determining the locations of the external devices based on the trigger signal.

The trigger signal according to an embodiment is not limited to the above-described example, and may be a signal including a voice command of the user. Therefore, for example, after receiving the trigger signal, the electronic device 1000 may determine that the device closest to the first location 110 among the one or more external devices 120 and 130 is to perform an operation corresponding to the voice command of the user.

In addition, according to an embodiment, the electronic device 1000 may identify at least one external device capable of performing the operation (e.g., an operation of turning on a lamp) corresponding to the voice command of the user, and determine an external device to perform the operation according to the determined location of each external device. The electronic device 1000 according to an embodiment may control the external device closest to the first location 110 among the identified at least one external device, to perform the operation (e.g., an operation of turning on a lamp). The external device closest to the first location 110 according to an embodiment may be determined based on a determined location of at least one external device according to an embodiment.

In addition, according to an embodiment, the electronic device 1000 may determine, according to the determined location of each external device, at least one external device to which the voice command of the user is to be transmitted, and transmit the voice command of the user to the determined at least one external device.

For example, when the user, the electronic device 1000, and the external devices 120 and 130 are present in a space of a certain size (e.g., a room or the interior of a vehicle), the electronic device 1000 may determine the external devices 120 and 130 by which the voice command of the user is to be performed or to which the voice command of the user is to be transmitted, according to relative distances between the external devices 120 and 130 and the user (i.e., the first location 110).

Without being limited to the above-described example, various operations may be performed on the at least one external device based on a determined location of the at least one external device.

The electronic device 1000 according to an embodiment may be a device capable of determining, according to reception of a trigger signal uttered by the user, the location of each of the external devices 120 and 130 in order to determine a device to perform a voice command of the user.

Like the electronic device 1000, each of the external devices 120 and 130 according to an embodiment may be a device capable of outputting, according to reception of the trigger signal uttered by the user, a chirp signal for the electronic device 1000 to determine the location of each of the external devices 120 and 130. In addition, each of the external devices 120 and 130 may be a device capable of performing an operation according to a voice command uttered by the user after the trigger signal is output, according to the determination by the electronic device 1000.

The electronic device 1000 and the one or more external devices 120 and 130 according to an embodiment may be implemented in various forms. For example, at least one of the electronic device 1000 and the one or more external devices 120 and 130 described in the present specification may be, but is not limited to, a digital camera, a smart phone, a laptop computer, a tablet personal computer (PC), an electronic book terminal, a digital broadcasting terminal, a personal digital assistant (PDA), a portable multimedia player (PMP), a navigation system, an MP3 player, a vehicle, or the like.

At least one of the electronic device 1000 and the one or more external devices 120 and 130 described in the present specification may be a wearable device that may be worn by a user. The wearable device may include at least one of an accessory-type device (e.g., a watch, a ring, a cuff band, an ankle band, a necklace, spectacles, and a contact lens), a head-mounted device (HMD), a textile or garment-integrated device (e.g. electronic garments), a body attachment device (e.g., a skin pad), or a bioimplantable device (e.g., an implantable circuit), but is not limited thereto. Hereinafter, for convenience of description, an example will be described, in which the electronic device 1000 is a smart phone and each of the one or more external devices 120 and 130 is one of various types of Internet-of-Things (IoT) devices around the user.

Because the electronic device 1000 and the one or more external devices 120 and 130 according to an embodiment receive the trigger signal at different locations, time points at which the respective devices receive the trigger signal may be different from each other. According to an embodiment, as the trigger signal travels at the speed of sound propagating in air (e.g., 331.5 m/s), the device closer to the first location 110 may receive the trigger signal faster.

According to an embodiment, the one or more external devices 120 and 130 other than the electronic device 1000 may output a chirp signal according to reception of the trigger signal. The chirp signal according to an embodiment may be a signal for determining the location of each of the external devices 120 and 130, and may be output from each of the external devices 120 and 130 according to reception of the trigger signal. The chirp signal output from each of the external devices 120 and 130 may be received by the electronic device 1000.

The chirp signal according to an embodiment may be a signal that may propagate through air, and for example, the chirp signal may be an ultrasonic signal outside an audible frequency band (e.g., 16 Hz to 20 kHz). Therefore, the electronic device 1000 and the external devices 120 and 130 according to an embodiment are capable of performing an operation of determining the location of an external device according to an embodiment only by using a microphone or a sensor capable of receiving an ultrasonic signal and a voice signal, a speaker capable of outputting an ultrasonic signal, and the like, without having to include a separate hardware component for receiving a chirp signal and a trigger signal.

The present disclosure is not limited thereto, and the chirp signal may be one of various types of signals including a voice signal.

The electronic device 1000 according to an embodiment may determine relative locations of the external devices 120 and 130 with respect to the first location 110, based on a time point at which the trigger signal is received, and each time point at which the chirp signal is received by the electronic device 1000. The first location 110 according to an embodiment may correspond to a location at which the user is able to utter a voice command.

According to an embodiment, the locations of the external devices 120 and 130 may be determined according to difference values between a time point at which the trigger signal is received by the electronic device 1000, and time points at which the trigger signal is received by the external devices 120 and 130, respectively, which are obtained based on time points at which the trigger signal is received and time points at which the chirp signals are received, respectively.

According to an embodiment, the difference value may include a value proportional to the distance between the first location 110 and each of the external devices 120 and 130.

For example, when the difference value is less than 0, it may be determined that the external device 120 or 130 is closer to the first location 110 than is the electronic device 1000. On the other hand, when the difference value for the external device 120 or 130 is greater than 0, it may be determined that the electronic device 1000 is closer to the first location than is the external device 120 or 130. In addition, when the difference value is 0, it may be determined that the external device 120 or 130 is present at the same location as that of the electronic device 1000.

In addition, when the difference value is less than 0, it may be determined that the external device 120 or 130 is closer to the first location 110 as the absolute value of the difference value is greater. Furthermore, when the difference value is greater than 0, it may be determined that the external device 120 or 130 is farther from the first location 110 as the absolute value of the difference value is greater.

Therefore, according to an embodiment, the electronic device 1000 may determine that the external device 120 or 130 having the smallest difference value, among the one or more external devices 120 and 130 is to perform an operation corresponding to a voice command to be uttered by the user after the trigger signal is output.

In addition, the present disclosure is not limited to the above-described example, the electronic device 1000 according to an embodiment may perform various operations based on the locations of the external devices 120 and 130 determined based on the difference values.

The electronic device 1000 according to an embodiment may obtain the difference value between the time point at which the trigger signal is received by the electronic device 1000 and the time point at which the trigger signal is received by the external device 120 or 130, based on a time point at which the chirp signal output from the external device 120 or 130 is received by the electronic device 1000, without information about the time point at which the trigger signal is received by the external device 120 or 130.

For example, as the trigger signal is received by each of the external devices 120 and 130, the chirp signal may be output after a predetermined time period Tw has elapsed from the time point at which the trigger signal is received by each of the external devices 120 and 130. According to an embodiment, a value obtained by subtracting, from the time point at which the chirp signal of each of the external devices 120 and 130 is received by the electronic device 1000, the sum of a time period taken for the chirp signal to be transmitted from each of the external devices 120 and 130 to the electronic device 1000 and the predetermined time period Tw may correspond to a time point at which the trigger signal is received by each of the external devices 120 and 130. Accordingly, the above-described difference value may be obtained based on the time point at which the chirp signal output from each external device 120 or 130 is received by the electronic device 1000.

According to an embodiment, the time period taken for the chirp signal to be transmitted from each of the external devices 120 and 130 to the electronic device 1000 may be obtained by additionally performing, by each of the external devices 120 and 130 and the electronic device 1000, an operation of obtaining a time period taken for the transmission. For example, the operation of obtaining a time period taken for the transmission may be performed periodically or upon a change in the location of at least one of the devices 1000, 120, and 130, and thus a time period taken to transmit a chirp signal between the external device 120 or 130 and the electronic device 1000 may be obtained.

According to an embodiment, a time period taken to transmit a chirp signal between the devices may be proportional to the distance between the external device 120 or 130 and the electronic device 1000. For example, as the distance between the external device 120 or 130 and the electronic device 1000 increases, the time period taken to transmit a chirp signal between the external device 120 or 130 and the electronic device 1000 may increase.

Figure 3:
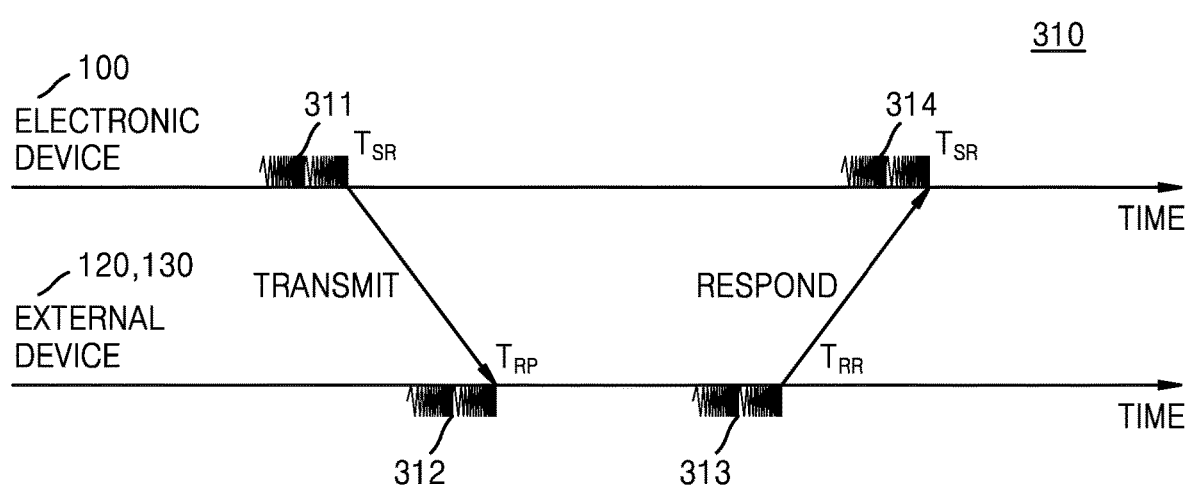
FIG. 3 is a diagram illustrating an example of obtaining a time period $t_{1i}$ taken for chirp signals to be received by an electronic device and an external device, according to an embodiment.

The time period taken for the transmission according to an embodiment may be obtained according to an operation of transmitting and receiving a chirp signal between the external device 120 or 130 and the electronic device 1000, as illustrated in FIG. 3, which will be described below.

Figure 2:
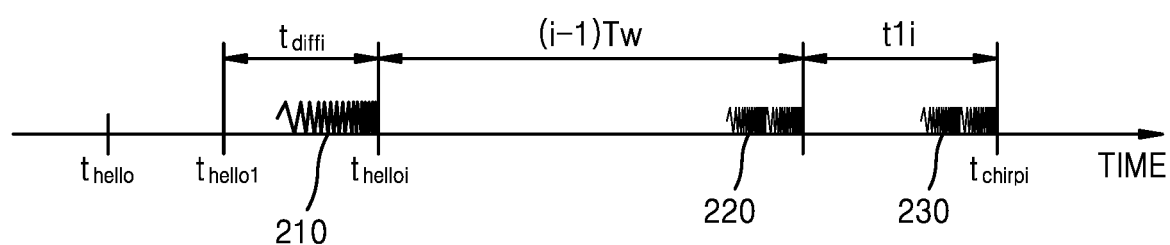
FIG. 2 is a diagram illustrating an example of a method of determining the location of an external device, according to an embodiment.

FIG. 2 is a diagram illustrating an example of a method of determining the location of the external device 120 or 130, according to an embodiment.

Referring to FIG. 2, at a time point $t_{hello}$, a voice may be uttered by the user at the first location 110, and thus a trigger signal may be output. According to an embodiment, the electronic device 1000 may receive the trigger signal at a time point $t_{hello1}$, and the external device 120 or 130 may receive the trigger signal at a time point $t_{helloi}$.

The time point $t_{helloi}$ according to an embodiment may be set to a time point at which a trigger signal 210 is completely received by the external device 120 or 130. The present disclosure is not limited to the above-described example, and the time point $t_{helloi}$ may be determined to be a time point at which the trigger signal 210 starts to be received by the external device 120 or 130, or may be determined to be a time point at which about half of the trigger signal 210 is received by the external device 120 or 130.

The time points $t_{hello1}$ and $t_{helloi}$ may vary depending on the distance between the first location 110 and the respective devices. Accordingly, the difference value between the time points $t_{hello1}$ and $t_{helloi}$ according to an embodiment may correspond to the difference between the distance between the first location 110 and the electronic device 1000, and the distance between the first location 110 and the external device 120 or 130.

In addition, the electronic device 1000 according to an embodiment may determine the relative distance between the external device 120 or 130 and the first location 110 (e.g., a degree to which the external device is closer to the first location than are other devices) based on the difference value.

As the received voice signal is detected to be the trigger signal 210, the external device 120 or 130 according to an embodiment may output a chirp signal 220 after a predetermined window interval (i−1)Tw, which is predetermined for each of the external devices 120 and 130, has elapsed from the time point $t_{helloi}$ at which the trigger signal 210 is completely received.

The window interval (i−1)Tw according to an embodiment may be preset differently for each of the external devices 120 and 130. For example, the window interval (i−1)Tw may be determined according to an index i assigned to each of the external devices 120 and 130.

The values of Tw may be constant values indicating predetermined time intervals such that the time points of reception of the chirp signals 220 output from the external devices 120 and 130 by the electronic device 1000 do not overlap each other. For example, values of Tw may be determined based on the size of a space in which the electronic device 1000 and the external devices 120 and 130 are present, according to the maximum time period taken for the chirp signals to be received by the electronic device 1000 and the external devices 120 and 130.

Therefore, according to an embodiment, as the chirp signals 220 are output in different window intervals, the chirp signals 220 output from the external devices 120 and 130, respectively, may be received by the electronic device 1000 without overlapping each other in time.

The index of each of the external devices 120 and 130 according to an embodiment may be previously assigned by the electronic device 1000 before the trigger signal 210 is received. For example, the electronic device 1000 may identify the one or more external devices 120 and 130 around the electronic device 1000 and thus assign different indices to the identified external devices 120 and 130. According to an embodiment, the index of the electronic device 1000 may be assigned with 1, and the index of each of the external devices 120 and 130 may be assigned with constants of 2 or greater.

The electronic device 1000 according to an embodiment may obtain in advance a time period $t_{1i}$ taken to receive the chirp signal 220 from the external device 120 or 130. Because the value of $t_{1i}$ may be determined according to the distance between the electronic device 1000 and the external device 120 or 130, an operation of obtaining the value of $t_{1i}$ may be performed periodically or when at least one of the electronic device 1000 and the external device 120 or 130 moves. Alternatively, the operation of obtaining the value of $t_{1i}$ may be performed when the trigger signal is received by the electronic device 1000 and the external device 120 or 130. The present disclosure is not limited to the above-described example, the value of $t_{1i}$ may be determined at various time points.

According to an embodiment, the value of $t_{1i}$ may be determined based on a time period measured as the electronic device 1000 and the external device 120 or 130 transmit and receive the chirp signals. The present disclosure is not limited to the above-described example, the value of $t_{1i}$ may be determined in various manners.

The electronic device 1000 according to an embodiment may obtain $t_{diffi}$, which is the above-described different value, based on a time point $t_{chirpi}$ at which a chirp signal 230 is received from the external device 120 or 130, according to Equation 1 below.

$$t_{diffi} = t_{helloi} - t_{hello1} = t_{chirpi} - t_{1i} - (i-1)T_W - t_{hello1} \qquad \text{Equation 1}$$

Referring to FIG. 2, the relative distance between the first location 110 and the external device 120 or 130 with respect to the distance between the first location 110 and the electronic device 1000 may be determined based on $t_{diffi}$. For example, when the distance between the first location 110 and the electronic device 1000 is set to 0, the relative distance between the external device 120 or 130 and the first location 110 may be determined. The present disclosure is not limited to the above-described example, the electronic device 1000 may determine the distance between the external device 120 or 130 and the first location 110 based on the time point $t_{chirpi}$ by using various methods.

FIG. 3 is a diagram illustrating an example of obtaining the time period $t_{1i}$ taken for chirp signals to be received by the electronic device 1000 and the external device 120 or 130, according to an embodiment.

Referring to FIG. 3, the electronic device 1000 according to an embodiment may transmit a second chirp signal 311 to the external device 120 or 130 at a time point $T_{SP}$. In addition, the external device 120 or 130 according to an embodiment may receive the second chirp signal 311 from the electronic device 1000 at a time point $T_{RP}$. Accordingly, the difference value between the time point $T_{SP}$ and the time point $T_{RP}$ may correspond to $t_{1i}$, which is the time period taken to receive the second chirp signal.

However, the time point $T_{RP}$, which is measurable by the external device 120 or 130, is unknown to the electronic device 1000 according to an embodiment. Accordingly, the electronic device 1000 may obtain $t_{1i}$ based on a time point at which the electronic device 1000 receives a third chirp signal 313 output by the external device 120 or 130 as a response signal at a time point $T_{RR}$ after the time point $T_{RP}$. The electronic device 1000 according to an embodiment may receive, at a time point $T_{SR}$, a third chirp signal 314 output by the external device 120 or 130.

The external device 120 or 130 according to an embodiment may transmit the value of $(T_{RR}-T_{RP})$ to the electronic device 1000 such that the electronic device 1000 obtains $t_{1i}$ according to Equation 2 below. After the third chirp signal 314 is received by the electronic device 1000, the external device 120 or 130 may transmit the value of $(T_{RR}-T_{RP})$ to the electronic device 1000 by using various communication channels and methods.

$$t_{1i} = \frac{T_{SR} - T_{SP} - (T_{RR} - T_{RP})}{2} \qquad \text{Equation 2}$$

According to Equation 2, $t_{1i}$ may be obtained based on a first time period between a time point at which the second chirp signal is transmitted from the electronic device 1000 to the external device and a time point at which the third chirp signal is received by the electronic device (e.g., $T_{SR}-T_{SP}$), and a second time period between a time point at which the second chirp signal is received by the external device and a time point at which the third chirp signal is transmitted from the external device to the electronic device (e.g., $T_{RR}-T_{RP}$).

In addition, $t_{1i}$ may be determined to be a value obtained by dividing, by 2, a value obtained by subtracting the second time period from the first time period, as shown in Equation 2.

In addition, according to an embodiment, as the value of $(T_{RR}-T_{RP})$, which is the second time period, is preset to be the value of $(2i-1)Tw$ or $2iTw$, which may be determined according to the index of the external device 120 or 130, $t_{1i}$ may be obtained without having to transmit the value of $(T_{RR}-T_{RP})$ from the external device 120 or 130 to the electronic device 1000.

For example, after a time period $(2i-1)Tw$ or $2iTw$ has elapsed from a time point at which the chirp signal 312 is completely received from the electronic device 1000, the external device 120 or 130 may completely output the chirp signal 313 as a response thereto. Accordingly, the electronic device 1000 may obtain, as the value of $(T_{RR}-T_{RP})$, $(2i-1)Tw$ or $2iTw$, which may be determined according to the index of the external device 120 or 130.

The value of $(2i-1)Tw$ or $2iTw$ according to an embodiment may be determined according to a method of determining window intervals in which the chirp signals 311 and 313 are transmitted and received between the electronic device 1000 and the external devices 120 and 130, which will be described below with reference to FIG. 4.

Figure 4:
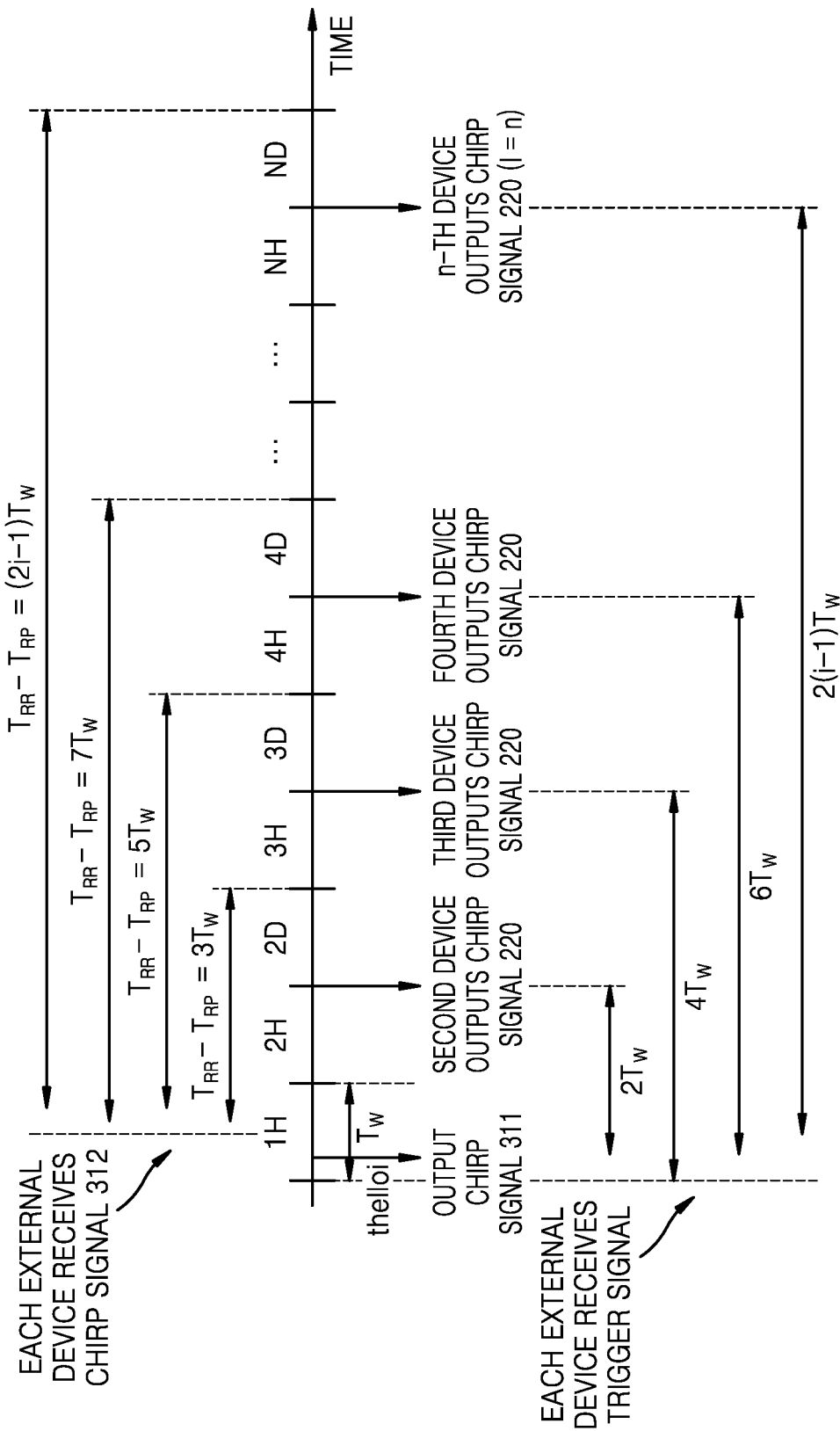
FIG. 4 is a diagram illustrating an example of time points at which chirp signals are transmitted, respectively, according to an embodiment.

FIG. 4 is a diagram illustrating an example of time points at which chirp signals are transmitted, respectively, according to an embodiment.

Referring to FIG. 4, according to an embodiment, the chirp signals 311 and 313 may be transmitted and received in different window intervals such that the time points of transmission and reception of the chirp signals 311 and 313 between the electronic device 1000 and the external devices 120 and 130 do not overlap each other.

In the following description, external devices assigned indices of 2, 3, 4, . . . are referred to as a second device, a third device, a fourth device, . . . , respectively. In addition, the electronic device 1000 may be assigned an index of 1.

According to an embodiment, window intervals 1H, 2H, 3H, . . . , iH may be set based on the time point $t_{hello}$ at which the trigger signal is output at the first location 110. In addition, for the respective external devices, window intervals 2D, 3D, 4D, . . . , iD may be set based on time points at which the chirp signal 312 transmitted from the electronic device 1000 is received, respectively.

The window intervals iD may be set based on different time points at which the chirp signal 312 of the electronic device 1000 is received by the respective external device. According to an embodiment, depending on the distances between the electronic device 1000 and the external devices, the chirp signal 312 may be received by the external devices at different time points. Therefore, in FIG. 4, different time points at which the chirp signal 312 of the electronic device 1000 is received by the respective external devices are indicated by dotted lines.

The window intervals iH and iD according to an embodiment may be set to 1H, 2H, 3H, . . . , iH and 2D, 3D, 4D, . . . , iD according to values determined based on the indices of the electronic device 1000 and the external devices 120 and 130, for example, $(2i-1)Tw$ (or, $2iTw$) and $2(i-1)Tw$ illustrated in FIG. 4.

Among the window intervals according to an embodiment, 1H may be an interval corresponding to the electronic device 1000, and may be set to be a time period having a length of Tw from the time point $t_{hello}$. The electronic device 1000 according to an embodiment may receive the trigger signal within the interval 1H and then output the chirp signal 311. The chirp signal 311 output from the electronic device 1000 in the interval 1H may be a signal for calculating the time period $t_{1i}$ taken for the chirp signal to be transmitted and received between the electronic device 1000 and the external device 120 or 130, and may be received by at least one external device.

Among the window intervals according to an embodiment, 2H may be set to be an interval subsequent to the interval 1H, with respect to the second device having an index of 2. The second device according to an embodiment may output the chirp signal 220 within the time interval 2H. As illustrated in FIGS. 1 and 2, as the second device receives the trigger signal, the chirp signal 220 according to an embodiment may be output at a time point at which $(i-1)Tw$ (=Tw when i=2) has elapsed from a time point at which the trigger signal is received.

The chirp signals 220 and 311 output from the respective devices according to an embodiment may be of the same type. Because the chirp signals 220 and 311 according to an embodiment may be received by a plurality of different devices, each device needs to recognize which devices output the received chirp signals 220 and 311, respectively.

Therefore, according to an embodiment, the time interval 2H may be set to be between time points at which the time periods Tw and 2Tw has elapsed from the time point $t_{hello}$, respectively, such that time points at which the chirp signal 220 output from the second device in the interval 2H and the chirp signal 311 output in the interval 1H are received by other devices (e.g., the third device and the fourth device), respectively, do not overlap each other.

According to an embodiment, as illustrated in FIG. 4, the time intervals iH and iD in which the chirp signals may be output or received may be set for the respective devices 1000, 120, and 130, and the chirp signals may be identified according to intervals to which time points at which the chirp signals are received by the respective devices 1000, 120, and 130 belong.

Among the window intervals according to an embodiment, 2D may be set for the second device having an index of 2 among the external devices 120 and 130.

The chirp signal 313 output in the interval iD according to an embodiment may be output, as the chirp signal 312 output by the electronic device 1000 in the interval 1H is received by an external device having an index of i, from the external device after a time period $(2i-1)Tw$ (or $2iTw$) has elapsed from a time point at which the chirp signal 312 is received.

iH and iD according to an embodiment may be set to be time intervals of $(2i-2)Tw$ and $(2i-1)Tw$ according to the indices of the external devices 120 and 130, respectively. iD according to an embodiment may be set to be one of a time interval of $(2i-1)Tw$ and a time interval of $2iTw$ such that chirp signals output from different devices do not overlap each other. The values of $(2i-2)Tw$ and $(2i-1)Tw$ (or $2iTw$) are set such that the interval iD has the same index as that of the interval iH, which is prior thereto, for example, 2H, 2D, 3H, 3D, . . . , as illustrated in FIG. 4. Although the interval iD is not based on the time point at which the trigger signal is output and thus there may be a vacant period between the preceding interval iH and the interval iD, the lengths of the time intervals iH and iD are much longer than the time period taken for the chirp signal of the electronic device 1000 to be received by each external device, and thus the chirp signals transmitted in each time interval may be transmitted without overlapping each other in time.

The lengths of the intervals iH and iD are not limited to the above-described examples, and may be determined by using various methods in which chirp signals transmitted from different devices are transmitted without overlapping each other in time.

Figure 5:
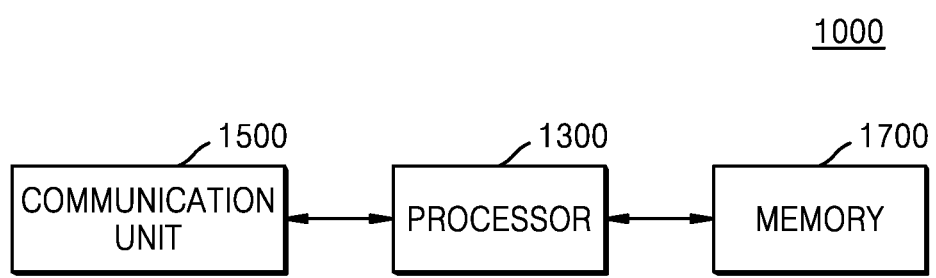
FIG. 5 is a block diagram for describing an internal configuration of an electronic device according to an embodiment.

FIG. 5 is a block diagram for describing an internal configuration of the electronic device 1000 according to an embodiment.

Figure 6:
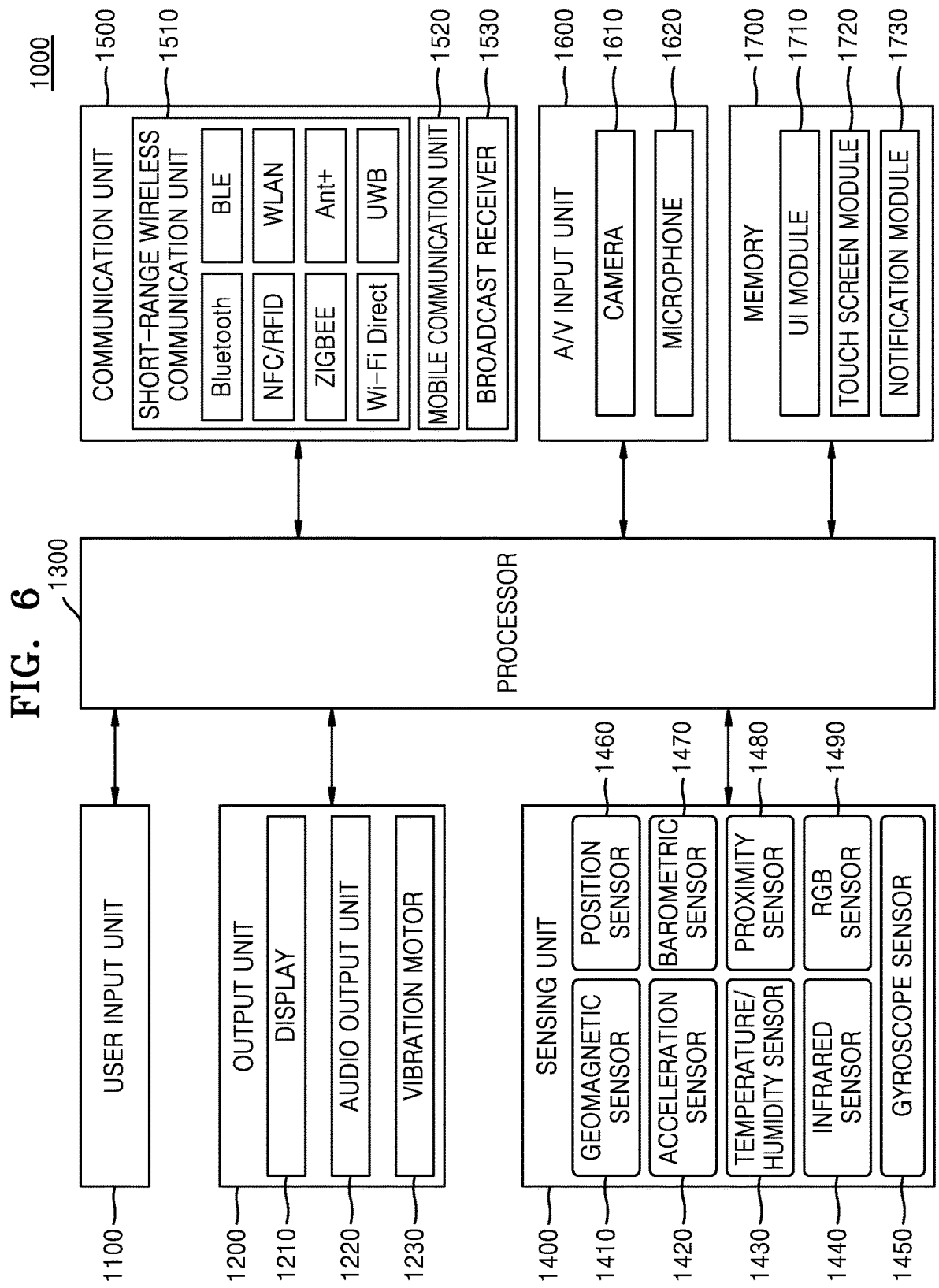
FIG. 6 is a block diagram for describing an internal configuration of an electronic device according to an embodiment.

FIG. 6 is a block diagram for describing an internal configuration of the electronic device 1000 according to an embodiment.

Referring to FIG. 5, the electronic device 1000 may include a processor 1300, a communication unit 1500, and a memory 1700. However, not all of the components illustrated in FIG. 5 are essential components of the electronic device 1000. The electronic device 1000 may be implemented by more components than the components illustrated in FIG. 5, or may be implemented by less components than the components illustrated in FIG. 5.

For example, as illustrated in FIG. 6, the electronic device 1000 according to an embodiment may further include a user input unit 1100, an output unit 1200, a sensing unit 1400, and an audio/video (A/V) input unit 1600, in addition to the processor 1300, the communication unit 1500, and the memory 1700.

The user input unit 1100 refers to a unit via which a user inputs data for controlling the electronic device 1000. For example, the user input unit 1100 may be, but is not limited to, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, or a jog switch.

According to an embodiment, the user input unit 1100 may receive a user input requesting a certain operation. The electronic device 1000 according to an embodiment may perform an operation of determining the location of an external device, according to a user input.

The output unit 1200 may output an audio signal, a video signal, or a vibration signal, and may include a display 1210, an audio output unit 1220, and a vibration motor 1230.

The display 1210 displays and outputs information processed by the electronic device 1000. According to an embodiment, the display 1210 may display a result of determining the location of an external device. In addition, the display 1210 may display information about an external device to perform a certain operation, according to a result of determining the location of the external device.

Meanwhile, when the display 1210 and a touch pad form a layer structure and thus constitute a touch screen, the display 1210 may also be used as an input device in addition to being used as an output device. The display 1210 may include at least one of a liquid-crystal display, a thin-film-transistor liquid-crystal display, an organic light-emitting diode, a flexible display, a three-dimensional (3D) display, and an electrophoretic display. In addition, the electronic device 1000 may include two or more displays 1210 according to an implementation of the electronic device 1000.

The audio output unit 1220 may output audio data received from the communication unit 1500 or stored in the memory 1700.

The vibration motor 1230 may output a vibration signal. Also, the vibration motor 1230 may output a vibration signal when a touch is input to the touch screen.

According to an embodiment, the audio output unit 1220 and the vibration motor 1230 may output a result of determining the location of an external device. In addition, the audio output unit 1220 and the vibration motor 1230 may output information about an external device to perform a certain operation, according to a result of determining the location of the external device.

The processor 1300 generally controls the overall operation of the electronic device 1000. For example, the processor 1300 may execute programs stored in the memory 1700 to control the overall operation of the user input unit 1100, the output unit 1200, the sensing unit 1400, the communication unit 1500, the A/V input unit 1600, and the like.

The electronic device 1000 may include at least one processor 1300. For example, the electronic device 1000 may include various types of processors, such as a central processing unit (CPU), a graphics processing unit (GPU), and a neural processing unit (NPU).

The processor 1300 may be configured to process commands of a computer program by performing basic arithmetic, logic, and input/output operations. The commands may be provided from the memory 1700 to the processor 1300, or may be received through the communication unit 1500 and provided to the processor 1300. For example, the processor 1300 may be configured to execute the commands according to program code stored in a recording device such as a memory.

The processor 1300 according to an embodiment may determine the location of a first external device based on a difference value between a time point at which a trigger signal output at a first location is received by the electronic device 1000, and a time point at which the first chirp signal transmitted by the first external device according to reception of the trigger signal is received. The processor 1300 according to an embodiment may determine, based on the location of the first external device, an external device to perform an operation according to a voice command of the user corresponding to the trigger signal, among at least one external device.

The difference value according to an embodiment may be obtained based on a time point at which a first chirp signal is received by the electronic device 1000, and a time period between a time point at which the first chirp signal is transmitted by the first external device and the time point at which the first chirp signal is received by the electronic device 1000. In addition, the time period between the time point at which the first chirp signal is transmitted by the first external device and the time point at which the first chirp signal is received by the electronic device 1000 may be obtained through signal transmission/reception operations for obtaining the time period performed by the electronic device 1000 and the first external device.

The sensing unit 1400 may detect a state of the electronic device 1000 or a state of the periphery of the electronic device 1000, and transmit the detected information to the processor 1300.

The sensing unit 1400 may include, but is not limited to, at least one of a geomagnetic sensor 1410, an acceleration sensor 1420, a temperature/humidity sensor 1430, an infrared sensor 1440, a gyroscope sensor 1450, a position sensor (e.g., a global positioning system (GPS)) 1460, a barometric sensor 1470, a proximity sensor 1480, and an RGB sensor (an illuminance sensor) 1490.

The sensing unit 1400 according to an embodiment may detect a trigger signal and chirp signals transmitted from external sources. For example, the sensing unit 1400 may include a sensor capable of detecting an acoustic or ultrasonic signal.

The communication unit 1500 may include one or more components that allow the electronic device 1000 to communicate with a server 2000 or an external device (not shown). For example, the communication unit 1500 may include a short-range wireless communication unit 1510, a mobile communication unit 1520, and a broadcast receiver 1530.

The short-range wireless communication unit 1510 may include, but is not limited to, a Bluetooth communication unit, a Bluetooth Low Energy (BLE) communication unit, a near-field communication (NFC) unit, a Wi-Fi communication unit, a Zigbee communication unit, an Infrared Data Association (IrDA) communication unit, a Wi-Fi Direct (WFD) communication unit, an ultra wideband (UWB) communication unit, an Ant+ communication unit, and the like.

The mobile communication unit 1520 transmits and receives a wireless signal to and from at least one of a base station, an external terminal, or a server, on a mobile communication network. Here, the wireless signal may include various types of data according to transmission and reception of voice call signals, video call signals, or text/multimedia messages.

The broadcast receiver 1530 receives a broadcast signal and/or broadcast-related information from the outside via a broadcast channel. The broadcast channels may include satellite channels and terrestrial channels. According to an embodiment, the electronic device 1000 may not include the broadcast receiver 1530.

According to an embodiment, the communication unit 1500 may transmit and receive data necessary to determine the location of the first external device. The communication unit 1500 according to an embodiment may receive a trigger signal and chirp signals transmitted from external sources or may transmit a chirp signal. For example, the communication unit 1500 may receive an acoustic or ultrasonic signal, or may transmit an ultrasonic signal.

The A/V input unit 1600 may receive an input of an audio signal or a video signal, and may include a camera 1610 and a microphone 1620. The camera 1610 may obtain an image frame such as a still image or a moving image by using an image sensor, in a video call mode or an image capturing mode. An image captured by the image sensor may be processed by the processor 1300 or a separate image processor (not shown).

The microphone 1620 receives an external audio signal, and processes the received audio signal into electrical voice data. For example, the microphone 1620 may receive a trigger signal (e.g., a voice command of the user) output from an external source, and process the trigger signal into voice data. The electronic device 1000 according to an embodiment may perform speech recognition on the voice data, and thus perform an operation corresponding to a result of the speech recognition, based on the location of each external device. For example, the electronic device 1000 may transmit a request signal to an external device closest to the location of the user among at least one external device, such that the external device performs the operation corresponding to the result of the speech recognition.

The memory 1700 may store a program for the processor 1300 to perform processing and control, and may store data input to the electronic device 1000 or output from the electronic device 1000.

The memory 1700 according to an embodiment may store data necessary to determine the location of an external device. For example, the memory 1700 may store a trigger signal and chirp signals received from external sources, and time points at which the trigger signal and the chirp signals are received, respectively.

The memory 1700 may include at least one of a flash memory-type storage medium, a hard disk-type storage medium, a multimedia card micro-type storage medium, a card-type memory (e.g., SD or XD memory), random-access memory (RAM), static RAM (SRAM), read-only memory (ROM), electrically erasable programmable ROM (EEPROM), programmable ROM (PROM), magnetic memory, a magnetic disk, and an optical disc.

Programs stored in the memory 1700 may be classified into a plurality of modules according to their functions, for example, into a user interface (UI) module 1710, a touch screen module 1720, a notification module 1730, and the like.

The UI module 1710 may provide a specialized UI, a graphical UI (GUI), or the like that interworks with the electronic device 1000, for each application. The touch screen module 1720 may detect a touch gesture on the touch screen by the user, and transmit information about the touch gesture to the processor 1300. The touch screen module 1720 according to some embodiments may recognize and analyze touch code. The touch screen module 1720 may be configured as separate hardware including a controller.

In order to detect a touch or a proximity touch on the touch screen, various sensors may be provided inside or near the touch screen. Examples of sensors for detecting a touch on a touch screen include a tactile sensor. The tactile sensor detects a contact of a particular object to a degree greater than or equal to the degree to which a human detects a touch. The tactile sensor may detect various pieces of information including the roughness of a contact surface, the rigidity of a contact object, or the temperature of a contact point.

User touch gestures may include tap, touch and hold, double-tap, drag, panning, flick, drag and drop, swipe, and the like.

The notification module 1730 may generate a signal for notifying of the occurrence of an event in the electronic device 1000.

Figure 7:
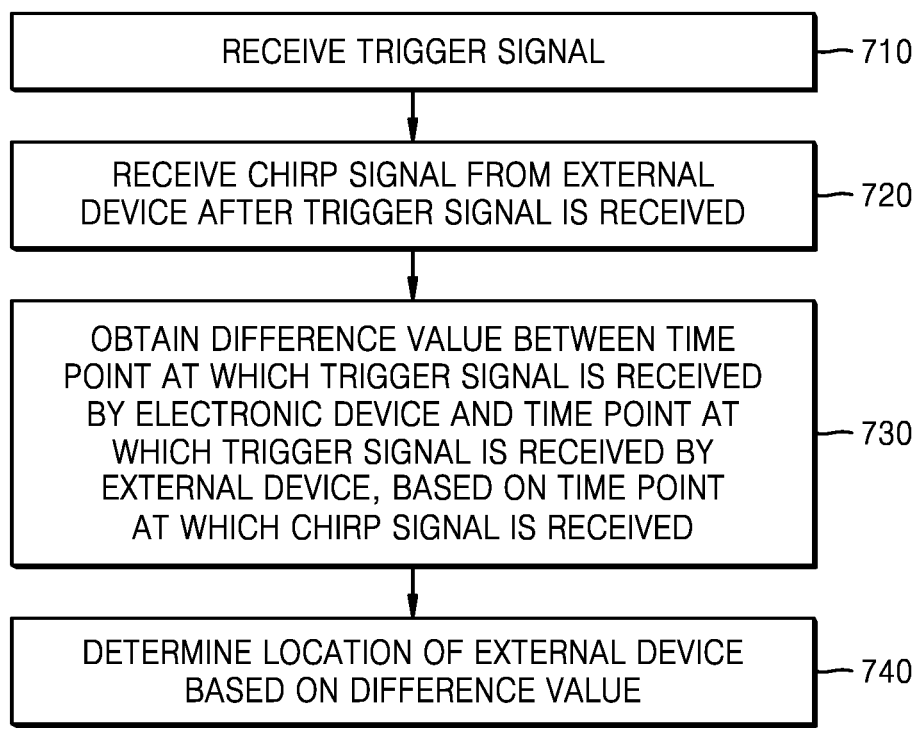
FIG. 7 is a flowchart illustrating a method of determining the location of an external device, according to an embodiment.

FIG. 7 is a flowchart illustrating a method of determining the location of an external device, according to an embodiment.

Referring to FIG. 7, in operation 710, the electronic device 1000 may receive a trigger signal output at a first location. For example, the electronic device 1000 may receive, as a trigger signal, a voice command uttered by the user at the first location.

As the trigger signal is received, the electronic device 1000 according to an embodiment may determine the location of at least one external device around the electronic device 1000 in order to perform an operation corresponding to the trigger signal. For example, the electronic device 1000 may request an external device closest to the first location at which the user is present, from among at least one external device, to perform an operation corresponding to the trigger signal. In addition, the electronic device 1000 may request an external device closest to the first location at which the user is present, among at least one external device capable of performing the operation corresponding to the trigger signal, to perform the operation corresponding to the trigger signal.

In operation S720, the electronic device 1000 may receive a chirp signal from at least one external device after the trigger signal is received.

The at least one external device according to an embodiment may transmit a chirp signal (i.e., a first chirp signal) according to reception of the same signal as the trigger signal received by the electronic device 1000 in operation 710.

The external device according to an embodiment may receive the trigger signal at a different time point from that at which the electronic device 1000 receives the trigger signal, depending on a difference in location with the electronic device 1000. For example, as the distance between the first location at which the user is present and the external device increases, the external device may receive the trigger signal at a later time point.

In operation S730, the electronic device 1000 may obtain a difference value between a time point at which the trigger signal is received by the electronic device 1000 and a time point at which the trigger signal is received by the external device, based on the time point at which the chirp signal is received in operation S720.

The difference value that may be obtained in operation 730 may be obtained based on the time point at which the chirp signal is received by the electronic device 1000, and a time period between the time point at which the chirp signal is transmitted by the external device and the time point at which the chirp signal is received by the electronic device 1000. However, according to an embodiment, the time period between the time point at which the chirp signal is transmitted by the external device and the time point at which the chirp signal is received by the electronic device 1000 may be obtained in advance by the electronic device 1000 performing an additional operation or may be obtained at a time point after the chirp signal is received.

According to an embodiment, the time period between the time point at which the chirp signal is transmitted by the external device and the time point at which the chirp signal is received by the electronic device 1000 may be obtained as the electronic device 1000 transmits a second chirp signal to the external device and the external device transmits a third chirp signal to the electronic device 1000.

According to an embodiment, a time period taken for the electronic device 1000 and the external device to transmit and receive the second chirp signal and the third chirp signal to and from each other may be obtained as a time period taken to transmit and receive chirp signals, for obtaining the difference value.

In operation S740, the electronic device 1000 may determine the location of the external device based on the difference value obtained in operation S730. For example, when the difference value is a negative value, as the absolute value of the difference value increases, the external device may be determined to be closer to the first location at which the user is present. In addition, when the difference value is a positive value, as the absolute value of the difference value decreases, the external device may be determined to be closer to the first location at which the user is present.

The electronic device 1000 according to an embodiment may transmit a signal for requesting a necessary operation corresponding to the trigger signal, to the external device closest to the user according to a result of the determining in operation 740. The external device according to an embodiment may perform the operation corresponding to the trigger signal according to reception of the request signal from the electronic device 1000.

Figure 8:
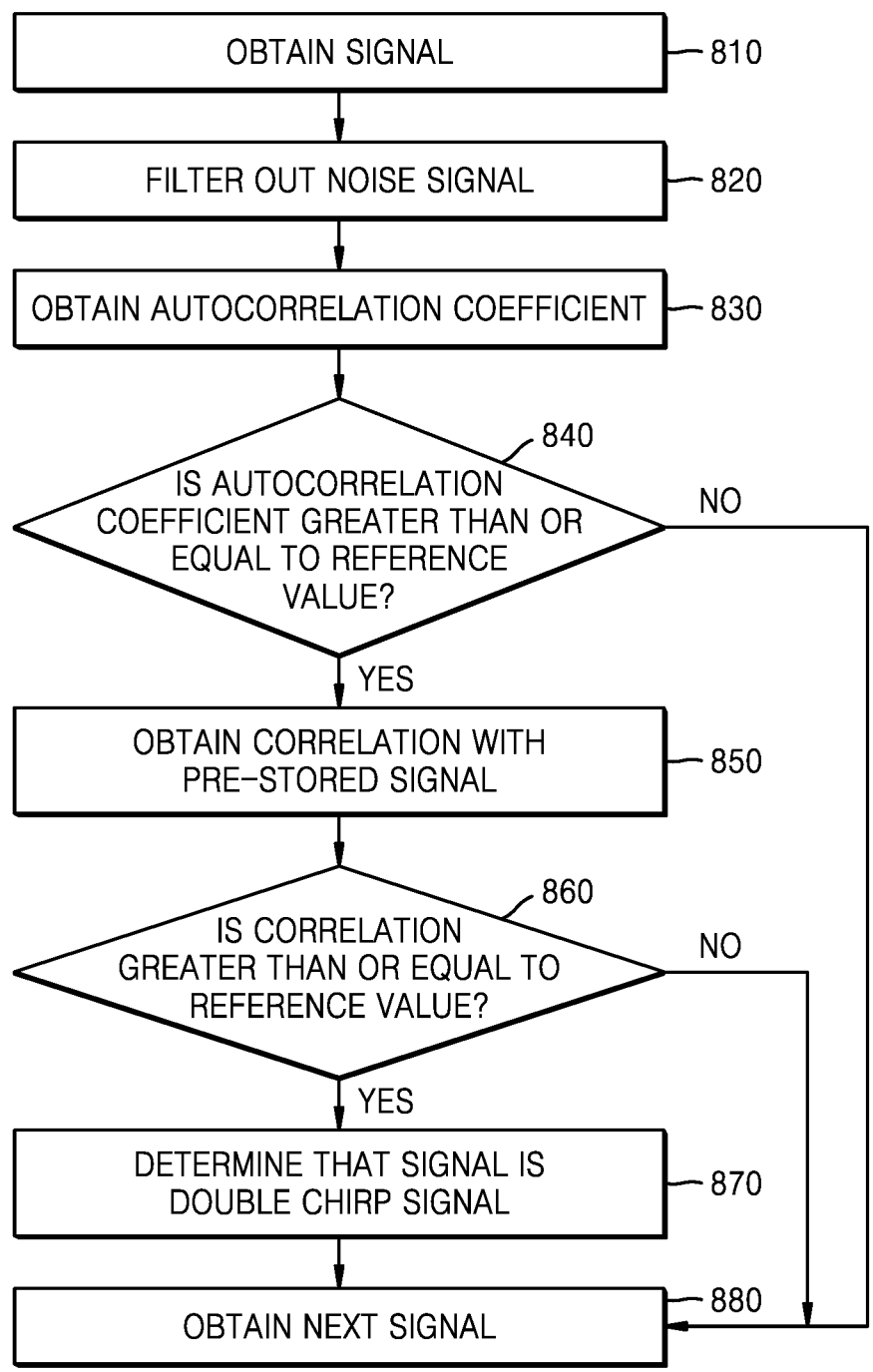
FIG. 8 is a flowchart illustrating a method of detecting a double chirp signal according to an embodiment.

FIG. 8 is a flowchart illustrating a method of detecting a double chirp signal according to an embodiment.

Referring to FIG. 8, in operation 810, the electronic device 1000 may obtain a signal from an external source. In operations 820 to 870, the electronic device 1000 according to an embodiment may determine whether the signal received from the external source is a double chirp signal according to an embodiment. The first chirp signal, the second chirp signal, and the third chirp signal according to an embodiment may be transmitted as a double chirp signal described above.

A single chirp signal that may be transmitted from each external device or the electronic device 1000 according to an embodiment may be generated according to Equation 3 below. According to an embodiment, a double chirp signal through which a single chirp signal according to Equation 3 is consecutively transmitted twice, may be transmitted from the external device as a chirp signal.

$$x(t) = \sin\left[\varphi_0 + 2\pi\left(f_0 t + \frac{f_1 - f_0}{2T}t^2\right)\right] \quad \text{Equation 3}$$

In Equation 3, T denotes the length of the single chirp signal, and for example, may be set to 50 ms. $f_0$ and $f_1$ denote the starting frequency and the final frequency, respectively, and may be set such that the operation of determining the location of an external device according to an embodiment is optimally performed. For example, $f_0$ and $f_1$ may be set to 18 kHz, 20.5 kHz, respectively.

In operation S820, the electronic device 1000 may perform filtering on the received signal.

According to an embodiment, a signal in a frequency band from $f_0$ to $f_1$ preset according to Equation 3 may be obtained as a double chirp signal, and a signal in other frequency bands may be filtered out as a noise signal. For example, a signal outside the frequency band from $f_0$ to $f_1$ may be filtered out as a noise signal by a band-pass finite impulse response (FIR) filter, an infinite impulse filter (IIR), or the like for filtering out a noise signal.

In operation 830, the electronic device 1000 may obtain an autocorrelation coefficient according to an autocorrelation function. A double chirp signal according to Equation 3 may be easily distinguished from other signals according to the autocorrelation function.

For example, it may be determined whether the received signal is a double chirp signal transmitted according to an embodiment, based on a correlation value between signals x and y, which is obtained according to Equation 4.

$$r_{xy} = \frac{\sum x_i y_i - n \sum x_i \sum y_i}{\sqrt{\left(\sum x_i^2 - n(\sum x_i)^2\right)} \sqrt{\left(\sum y_i^2 - n(\sum y_i)^2\right)}} \quad \text{Equation 4}$$

According to an embodiment, for a double chirp signal, the length of the single chirp signal x may be set to T, and the signal y may be set according to $y_i = x_{i-T}$, such that an autocorrelation coefficient for the double chirp signal is obtained according to Equation 4.

In operation 840, the electronic device 1000 may determine whether the autocorrelation coefficient obtained in operation 830 is greater than or equal to a reference value. For example, when the autocorrelation coefficient is 0.6 to 0.8, the electronic device 1000 may additionally determine whether the signal obtained in operation 810 is a double chirp signal in operations 850 to 870.

On the other hand, when the autocorrelation coefficient is less than or equal to the reference value, it is determined that the signal obtained in operation 810 is not a double chirp signal, and thus, in operation 880, the electronic device 1000 may perform operations 810 to 870 with respect to other signals additionally received.

In operation 850, the electronic device 1000 may obtain a correlation between a pre-stored signal y and a signal x obtained in operation 810, according to Equation 4. According to an embodiment, the pre-stored signal y may be a pattern signal that is pre-stored as a signal corresponding to a single chirp signal or a double chirp signal.

In operation 860, the electronic device 1000 may determine whether the correlation obtained in operation 850 is greater than or equal to a reference value. For example, when the correlation is 0.15 to 0.6, in operation 870, the electronic device 1000 may determine that the signal obtained in operation 810 is a double chirp signal.

On the other hand, when the correlation is less than or equal to the reference value, it is determined that the signal obtained in operation 810 is not a double chirp signal, and thus, in operation 880, the electronic device 1000 may perform operations 810 to 870 with respect to other signals additionally received.

In operation 880, the electronic device 1000 may detect a double chirp signal by performing operations 810 to 870 on other signals additionally received thereafter.

Figure 9:
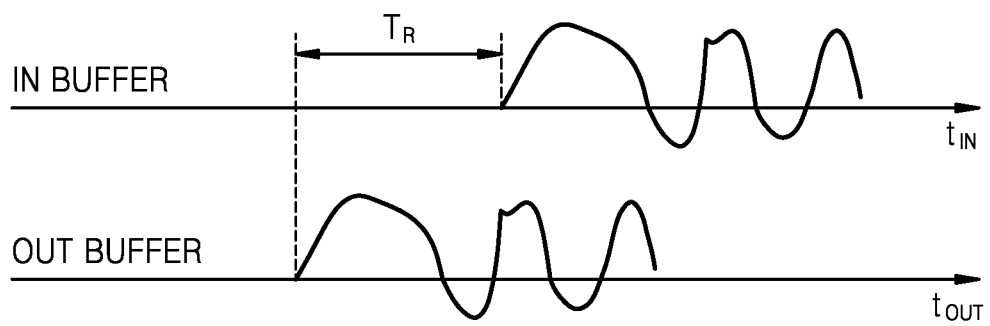
FIG. 9 is a diagram illustrating an example of a buffer in which a chirp signal is stored, according to an embodiment.

FIG. 9 is a diagram illustrating an example of a buffer in which a chirp signal is stored, according to an embodiment.

Referring to FIG. 9, a chirp signal (e.g., a double chirp signal) transmitted from the electronic device 1000 or an external device may be stored in each of an input buffer and an output buffer of the electronic device 1000 or the external device from which the chirp signal is transmitted.

According to an embodiment, the chirp signal stored in the output buffer may be used by the electronic device 1000 or the external device to transmit the chirp signal. For example, a chirp signal is first stored in the output buffer of the electronic device 1000 or the external device, and then the chirp signal stored in the output buffer may be output (e.g., transmitted).

In addition, a chirp signal stored in the input buffer may be used by the electronic device 1000 or the external device to process an operation related to the transmitted chirp signal (e.g., obtaining the time point of transmission of the chirp signal). For example, a chirp signal is first stored in the output buffer of the electronic device 1000 or an external device, and then the same signal as the chirp signal may be stored in the input buffer. In addition, based on the chirp signal stored in the input buffer, an operation (e.g., obtaining the time point of transmission of the chirp signal) according to an embodiment may be performed by the electronic device 1000 or the external device.

According to an embodiment, as a chirp signal to be transmitted from the electronic device 1000 or the external device is first stored in the output buffer and then stored in the input buffer, there may be a time difference as much as $T_R$ as illustrated in FIG. 8.

$$T_R = t_{IN} - t_{OUT} \quad \text{Equation 5}$$

Referring to Equation 5, the difference between time points of transmission of a chirp signal stored in the input buffer and the output buffer may be obtained as the difference between $t_{IN}$ and $t_{OUT}$, which are time points at which the chirp signal are recorded in the input buffer and the output buffer, respectively.

According to an embodiment, it is assumed that the chirp signal transmitted from the electronic device 1000 or the external device is first stored in the output buffer and then stored in the input buffer, but the present disclosure is not limited to the above-described example, and the chirp signal may be first stored in the input buffer and then stored in the output buffer, and the time difference may be obtained according to Equation 5.

According to an embodiment, the time point of transmission of a chirp signal transmitted from a device may be obtained based on the chirp signal stored in the input buffer, and for example, the time point of transmission of the chirp signal transmitted after a time period $t_{IN0}$ from a time point $t_d$ may be determined to be a time point $t_d + t_{IN0} - T_R$.

The present disclosure is not limited to the above-described example, and a time point of transmission of a chirp signal according to an embodiment may be obtained by using various methods.

According to an embodiment, an external device determined to be closest to the user, among at least one external device, may be determined to be a device to perform an operation according to a voice command of the user.

A machine-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment, the method according to various embodiments disclosed herein may be included in a computer program product and provided. The computer program product may be traded between a seller and a purchaser as a commodity. The computer program product may be distributed in the form of a machine-readable storage medium (e.g., a CD-ROM), or may be distributed online (e.g., downloaded or uploaded) through an application store (e.g., Play Store™) or directly between two user devices (e.g., smart phones). In the case of online distribution, at least a portion of the computer program product (e.g., a downloadable app) may be temporarily stored in a machine-readable storage medium such as a manufacturer's server, an application store's server, or a memory of a relay server.

In addition, in the present specification, the term "unit" may be a hardware component such as a processor or a circuit, and/or a software component executed by a hardware component such as a processor.

The above-described description of the present disclosure is provided only for illustrative purposes, and those of skill in the art will understand that the disclosure may be easily modified into other detailed configurations without modifying technical aspects and essential features of the present disclosure. Therefore, it should be understood that the above-described embodiments of the present disclosure are exemplary in all respects and are not limited. For example, the elements described as single entities may be distributed in implementation, and similarly, the elements described as distributed may be combined in implementation.

The scope of the present disclosure is not defined by the detailed description of the present disclosure but by the following claims, and all modifications or alternatives derived from the scope and spirit of the claims and equivalents thereof fall within the scope of the present disclosure.

The invention claimed is:

1. A method, performed by an electronic device, of determining a location of an external device, the method comprising:

receiving a trigger signal, which is output at a first location;

receiving, after the trigger signal is received, a first chirp signal transmitted from a first external device among at least one external device present at a different location from a location of the electronic device, the first chirp signal being transmitted according to the trigger signal being received by the first external device;

obtaining, based on a time point at which the first chirp signal is received, a difference value between a time point at which the trigger signal is received by the electronic device and a time point at which the trigger signal is received by the first external device; and determining a location of the first external device based on the difference value.

2. The method of claim 1, wherein the difference value is obtained based on a time point at which the first chirp signal is received by the electronic device, and a time period between a time point at which the first chirp signal is transmitted from the first external device and the time point at which the first chirp signal is received by the electronic device.

3. The method of claim 2, wherein the obtaining of the difference value comprises:

transmitting a second chirp signal from the electronic device to the first external device;

receiving a third chirp signal from the first external device; and obtaining, as the time period between the time point at which the first chirp signal is transmitted from the first external device and the time point at which the first chirp signal is received by the electronic device, a time period taken for the second chirp signal and the third chirp signal to be transmitted and received by the first external device and the electronic device, respectively.

4. The method of claim 3, wherein the obtaining of the time period taken comprises:

obtaining a first time period between a time point at which the second chirp signal is transmitted from the electronic device to the first external device and a time point at which the third chirp signal is received by the electronic device;

obtaining a second time period between a time point at which the second chirp signal is received by the first external device and a time point at which the third chirp signal is transmitted from the first external device to the electronic device; and obtaining the time period taken, based on the first time period and the second time period.

5. The method of claim 4, wherein the time period taken is determined by dividing, by 2, a value obtained by subtracting the second time period from the first time period.

6. The method of claim 1, wherein an index, which is a constant of 1 or greater, for identifying each external device is assigned to each of the at least one external device, wherein a first time interval based on a time point at which the trigger signal is received by the first external device is determined based on the index of the first external device, and wherein the first chirp signal is transmitted from the first external device in the determined first time interval.

7. The method of claim 1, wherein the determining of the location of the first external device comprises determining that the first external device is closer to the first location as the difference value decreases.

8. At least one non-transitory computer-readable recording medium having recorded thereon a program for implementing the method of claim 7.

9. An electronic device for determining a location of an external device, the electronic device comprising:

a communication unit configured to receive a trigger signal, which is output at a first location, and receive, after the trigger signal is received, a first chirp signal transmitted from a first external device among at least one external device present at a different location from a location of the electronic device, the first chirp signal being transmitted according to the trigger signal being received by the first external device;

at least one processor configured to obtain, based on a time point at which the first chirp signal is received, a difference value between a time point at which the trigger signal is received by the electronic device and a time point at which the trigger signal is received by the first external device, and determine a location of the first external device based on the difference value; and a memory storing the trigger signal and the first chirp signal, which are received by the electronic device.

10. The electronic device of claim 9, wherein the difference value is obtained based on a time point at which the first chirp signal is received by the electronic device, and a time period between a time point at which the first chirp signal is transmitted from the first external device and the time point at which the first chirp signal is received by the electronic device.

11. The electronic device of claim 10, wherein the at least one processor is further configured to:

transmit a second chirp signal from the electronic device to the first external device, receive a third chirp signal from the first external device, and obtain, as the time period between the time point at which the first chirp signal is transmitted from the first external device and the time point at which the first chirp signal is received by the electronic device, a time period taken for the second chirp signal and the third chirp signal to be transmitted and received by the first external device and the electronic device, respectively.

12. The electronic device of claim 11, wherein the at least one processor is further configured to:

obtain a first time period between a time point at which the second chirp signal is transmitted from the electronic device to the first external device and a time point at which the third chirp signal is received by the electronic device, obtain a second time period between a time point at which the second chirp signal is received by the first external device and a time point at which the third chirp signal is transmitted from the first external device to the electronic device, and obtain the time period taken, based on the first time period and the second time period.

13. The electronic device of claim 12, wherein the time period taken is determined by dividing, by 2, a value obtained by subtracting the second time period from the first time period.

14. The electronic device of claim 9, wherein an index, which is a constant of 1 or greater, for identifying each external device is assigned to each of the at least one external device, wherein a first time interval based on a time point at which the trigger signal is received by the first external device is determined based on the index of the first external device, and wherein the first chirp signal is transmitted from the first external device in the determined first time interval.

15. The electronic device of claim 9, wherein the at least one processor is further configured to determine that the first external device is closer to the first location as the difference value decreases.

\* \* \* \* \*